United States Patent
Hodge

(10) Patent No.: US 10,887,823 B2
(45) Date of Patent: Jan. 5, 2021

(54) SYSTEM AND METHOD FOR DETECTING AND CONTROLLING CONTRABAND DEVICES

(71) Applicant: **Global Tel*Link Corporation**, Reston, VA (US)

(72) Inventor: Stephen Lee Hodge, Aubrey, TX (US)

(73) Assignee: **Global Tel*Link Corporation**, Reston, VA (US)

( * ) Notice: Subject to any disclaimer, the term of this patent is extended or adjusted under 35 U.S.C. 154(b) by 0 days.

(21) Appl. No.: 16/518,502

(22) Filed: Jul. 22, 2019

(65) Prior Publication Data

US 2020/0022062 A1 Jan. 16, 2020

Related U.S. Application Data

(63) Continuation of application No. 15/878,135, filed on Jan. 23, 2018, now Pat. No. 10,362,528, which is a
(Continued)

(51) Int. Cl.
| | |
|---|---|
| *H04W 48/02* | (2009.01) |
| *H04W 64/00* | (2009.01) |
| *H04W 8/00* | (2009.01) |
| *H04W 24/10* | (2009.01) |
| *H04W 24/04* | (2009.01) |
| *H04W 8/26* | (2009.01) |

(52) U.S. Cl.
CPC .......... *H04W 48/02* (2013.01); *H04W 8/005* (2013.01); *H04W 8/26* (2013.01); *H04W 24/04* (2013.01);
(Continued)

(58) Field of Classification Search
CPC .................................................... H04W 64/00
See application file for complete search history.

(56) References Cited

U.S. PATENT DOCUMENTS

| | | |
|---|---|---|
| 4,136,764 A | 1/1979 | Johnson |
| 4,598,810 A | 7/1986 | Shore et al. |

(Continued)

FOREIGN PATENT DOCUMENTS

| | | |
|---|---|---|
| EP | 0159359 A1 | 10/1985 |
| EP | 0239110 A2 | 9/1987 |

(Continued)

OTHER PUBLICATIONS

"Controlling Wireless Abuse in Restricted Areas", Cell Block Technologies, Inc., www.cell-block-r.com, Prison Review International, Apr. 2002.
(Continued)

*Primary Examiner* — Joshua L Schwartz
(74) *Attorney, Agent, or Firm* — Sterne, Kessler, Goldstein & Fox P.L.L.C.

(57) ABSTRACT

The growing problem of contraband devices being smuggled into a correctional facility raises both security and safety issue. General fixed contraband detection systems are not cost effective because they require a high up-front cost and high maintenance, training and upgrade cost after installation. The present disclosure provides details of a system and method to detect and control the usage of contraband devices in a correctional facility cost effectively. Such a system is portable and can be relocated to different locations. Such as system both detects contraband devices and disrupts the operations of the contraband devices. Such a system further provides a report on the severity of contraband usage to the correctional facility.

20 Claims, 8 Drawing Sheets

Related U.S. Application Data continuation of application No. 15/484,883, filed on Apr. 11, 2017, now abandoned.

(52) U.S. Cl.
CPC ......... *H04W 24/10* (2013.01); *H04W 64/003* (2013.01)

(56) References Cited

U.S. PATENT DOCUMENTS

| | | |
|---|---|---|
| 4,866,661 A | 9/1989 | de Prins |
| 4,896,024 A | 1/1990 | Morello et al. |
| 4,951,308 A | 8/1990 | Bishop et al. |
| 5,172,829 A | 12/1992 | Dellicker |
| 5,386,462 A | 1/1995 | Schlamp |
| 5,678,200 A | 10/1997 | Levi |
| 5,744,933 A | 4/1998 | Inoue et al. |
| 5,940,764 A | 8/1999 | Mikami |
| 6,201,973 B1 | 3/2001 | Kowaguchi |
| 6,496,703 B1 | 12/2002 | da Silva |
| 6,799,052 B2 | 9/2004 | Agness et al. |
| 6,799,084 B2 | 9/2004 | Grobler |
| 6,830,160 B2 | 12/2004 | Risolia |
| 6,866,193 B1 | 3/2005 | Shimizu et al. |
| 6,880,754 B1 | 4/2005 | Lie-Nielsen et al. |
| 6,896,145 B2 | 5/2005 | Higgins et al. |
| 6,975,941 B1 | 12/2005 | Lau et al. |
| 7,142,108 B2 | 11/2006 | Diener et al. |
| 7,233,916 B2 | 6/2007 | Schultz |
| 8,019,354 B2 | 9/2011 | Rae et al. |
| 8,078,190 B2 | 12/2011 | Noonan et al. |
| 8,099,080 B1 | 1/2012 | Rae et al. |
| 8,106,752 B2 | 1/2012 | Golden |
| 8,175,577 B1 | 5/2012 | Harvey et al. |
| 8,233,880 B2 | 7/2012 | Johnson et al. |
| 8,238,936 B2 | 8/2012 | Nadler et al. |
| 8,254,886 B2 | 8/2012 | Salkini et al. |
| 8,311,892 B2 | 11/2012 | Junger |
| 8,346,281 B2 | 1/2013 | Noonan et al. |
| 8,365,868 B2 | 2/2013 | Johnson et al. |
| 8,421,630 B2 | 4/2013 | Butler et al. |
| 8,509,740 B2 | 8/2013 | Salkini et al. |
| 8,509,818 B2 | 8/2013 | Schork et al. |
| 8,583,078 B2 | 11/2013 | Sweeney et al. |
| 8,606,229 B2 | 12/2013 | Johnson et al. |
| 8,626,195 B2 | 1/2014 | Noonan et al. |
| 8,750,903 B1 | 6/2014 | Fitzsimmons et al. |
| 8,825,011 B2 | 9/2014 | Salkini et al. |
| 8,981,925 B2 | 3/2015 | Chapin et al. |
| 8,983,446 B2 | 3/2015 | Nadler et al. |
| 9,295,071 B2 | 3/2016 | Salkini et al. |
| 9,301,102 B2 | 3/2016 | Noonan et al. |
| 9,313,639 B2 | 4/2016 | Salkini et al. |
| 9,332,412 B2 | 5/2016 | Salkini et al. |
| 9,332,520 B2 | 5/2016 | Nadler et al. |
| 9,355,515 B2 | 5/2016 | Brahami et al. |
| 9,508,212 B2 | 11/2016 | Peters et al. |
| 9,584,252 B1 | 2/2017 | Salyers et al. |
| 9,681,360 B1 | 6/2017 | Salyers et al. |
| 10,362,528 B2 | 7/2019 | Hodge |
| 2001/0036821 A1 | 11/2001 | Gainsboro et al. |
| 2001/0041987 A1 | 11/2001 | Ichikawa |
| 2002/0036995 A1 | 3/2002 | Dalsgaard |
| 2002/0094780 A1 | 7/2002 | Payton et al. |
| 2002/0116208 A1 | 8/2002 | Chirnomas |
| 2003/0017821 A1 | 1/2003 | Irvin |
| 2003/0030539 A1 | 2/2003 | McGarry et al. |
| 2003/0143943 A1 | 7/2003 | Kline |
| 2004/0044697 A1 | 3/2004 | Nixon |
| 2005/0060246 A1 | 3/2005 | Lastinger et al. |
| 2005/0128069 A1* | 6/2005 | Skatter ............... G01V 5/0008 340/522 |
| 2005/0211768 A1 | 9/2005 | Stillman |
| 2006/0079218 A1 | 4/2006 | Aldridge et al. |
| 2006/0165217 A1 | 7/2006 | Skatter |
| 2007/0041545 A1 | 2/2007 | Gainsboro |
| 2007/0041581 A1 | 2/2007 | Frost |
| 2007/0050271 A1 | 3/2007 | Ufford et al. |
| 2007/0099667 A1 | 5/2007 | Graham et al. |
| 2007/0159991 A1 | 7/2007 | Noonan et al. |
| 2008/0005225 A1 | 1/2008 | Ferguson et al. |
| 2008/0057976 A1 | 3/2008 | Rae et al. |
| 2008/0058985 A1 | 3/2008 | Alcov |
| 2008/0168515 A1 | 7/2008 | Benson et al. |
| 2010/0105416 A1 | 4/2010 | Nadler et al. |
| 2010/0151820 A1 | 6/2010 | Mulherin et al. |
| 2011/0093622 A1 | 4/2011 | Hahn et al. |
| 2011/0258135 A1 | 10/2011 | Paul et al. |
| 2012/0040650 A1 | 2/2012 | Rosen |
| 2012/0078413 A1 | 3/2012 | Baker |
| 2012/0215347 A1 | 8/2012 | Illingworth et al. |
| 2012/0248183 A1 | 10/2012 | Cook |
| 2012/0295646 A1 | 11/2012 | Johnson |
| 2013/0036018 A1 | 2/2013 | Dickerson |
| 2013/0307533 A1 | 11/2013 | Keene et al. |
| 2014/0018059 A1* | 1/2014 | Noonan ............ H04M 1/72572 455/419 |
| 2014/0066012 A1 | 3/2014 | Sweeney et al. |
| 2014/0120827 A1 | 5/2014 | Johnson |
| 2014/0128023 A1 | 5/2014 | Guerra |
| 2014/0148947 A1 | 5/2014 | Levesque et al. |
| 2014/0194084 A1 | 7/2014 | Noonan et al. |
| 2014/0253322 A1 | 9/2014 | Chapin et al. |
| 2014/0297487 A1 | 10/2014 | Bashkin |
| 2014/0330682 A1 | 11/2014 | Knight |
| 2014/0344116 A1 | 11/2014 | Paracha et al. |
| 2014/0367466 A1 | 12/2014 | Pai et al. |
| 2015/0054639 A1 | 2/2015 | Noonan |
| 2015/0069174 A1 | 3/2015 | Wang et al. |
| 2015/0077221 A1 | 3/2015 | Peters et al. |
| 2015/0079935 A1 | 3/2015 | Maguire et al. |
| 2015/0225072 A1 | 8/2015 | Torre |
| 2015/0279147 A1 | 10/2015 | Illingworth et al. |
| 2015/0356801 A1 | 12/2015 | Nitu et al. |
| 2015/0363749 A1 | 12/2015 | Buscher |
| 2016/0006922 A1 | 1/2016 | Boudreau et al. |
| 2016/0099590 A1 | 4/2016 | Velderman et al. |
| 2016/0180632 A1 | 6/2016 | Santana et al. |
| 2016/0300409 A1 | 10/2016 | Peters et al. |
| 2016/0328979 A1 | 11/2016 | Postrel |
| 2017/0094520 A1 | 3/2017 | Salyers et al. |
| 2017/0094521 A1 | 3/2017 | Salyers et al. |
| 2017/0094534 A1 | 3/2017 | Salyers et al. |
| 2017/0261604 A1 | 9/2017 | Van Voorst |
| 2017/0286649 A1 | 10/2017 | Lowenthal et al. |
| 2017/0287295 A1* | 10/2017 | Aswath ............ G08B 13/19621 |
| 2017/0345248 A1 | 11/2017 | Peters et al. |
| 2017/0358169 A1 | 12/2017 | Peters et al. |
| 2018/0062784 A1 | 3/2018 | Hodge |
| 2018/0062785 A1 | 3/2018 | Hodge |
| 2018/0062786 A1 | 3/2018 | Hodge |
| 2018/0097931 A1 | 4/2018 | Hodge |
| 2018/0295560 A1 | 10/2018 | Hodge |
| 2018/0295562 A1 | 10/2018 | Hodge |

FOREIGN PATENT DOCUMENTS

| | | |
|---|---|---|
| EP | 2182752 A1 | 5/2010 |
| EP | 2328130 A1 | 1/2011 |
| EP | 3032883 A2 | 6/2016 |
| WO | WO 2007/137067 A2 | 11/2007 |
| WO | WO 2008/073566 A2 | 6/2008 |
| WO | WO 2012/174324 A1 | 12/2012 |

OTHER PUBLICATIONS

"No More 'Cell' Phones," TECHbeat, Winter 2005.
Cellbuster Cell Phone Detector, Cellbusters Mobile Security Products, Cellbusters.Com, Phoenix, Arizona, available Aug. 16, 2006.
Efstathiou et al., "The Mobile-Phone Silencers Controversy," Jan. 2002, Athens: Athens University of Economics and Business, Department of Computer Science, Mobile Multimedia Library, Jan. 2002; 4 pages.

(56) References Cited

OTHER PUBLICATIONS

Excerpts from the Prosecution History of U.S. Appl. No. 11/504,979, filed Aug. 16, 2006.
Excerpts from the Prosecution History of U.S. Appl. No. 13/562,057, filed Jul. 30, 2012.
GSM Pocket Cellular Phone Detector, www.cellular.co.za, accessed Oct. 6, 2005.
U.S. Appl. No. 60/602,838, filed Aug. 19, 2004.
Xu, et al., "The Feasibility of Launching and Detecting Jamming Attacks in Wireless Networks," Urbana-Champaign, IL, 2005, available at https://nslab.kaistac.kr/courses/2006/cs710/paperlist/security/35.pdf; 12 pages.
International Search Report and Written Opinion of the International Searching Authority directed to International Patent Application No. PCT/US2017/046596, dated Dec. 7, 2017; 12 pages.
International Search Report and Written Opinion of the International Searching Authority directed to International Patent Application No. PCT/US2017/054974, dated Oct. 19, 2017; 10 pages.
International Search Report and Written Opinion of the International Searching Authority directed to International Patent Application No. PCT/US2017/066428, dated Apr. 12, 2018; 12 pages.
International Search Report and Written Opinion of the International Searching Authority directed to related International Patent Application No. PCT/US2018/027142, dated Jul. 16, 2018; 13 pages.

* cited by examiner

SYSTEM AND METHOD FOR DETECTING AND CONTROLLING CONTRABAND DEVICES

CROSS-REFERENCE TO RELATED APPLICATIONS

This application is a continuation of U.S. patent application Ser. No. 15/878,135, filed on Jan. 23, 2018, which is a continuation of U.S. patent application Ser. No. 15/484,883, filed on Apr. 11, 2017, now abandoned, both of which are incorporated by reference herein in their entirety.

BACKGROUND

Field

The disclosure relates to a system and method for detecting and controlling contraband devices in a correctional facility.

Background

In corrections environments such as prisons, telecommunications are highly monitored and controlled. However, contraband devices are frequently discovered in correctional facilities. Contraband device usage by inmates poses both a safety and a security risk by interrupting the monitoring processes in prisons. To combat the usage the usage of contraband devices, a fixed detection system can be installed within the correctional facility. Such fixed detection systems, however, usually requires a large upfront cost for installation. The operation and maintenance of the system, training of the staff, and system software, firmware and hardware upgrade can result in further cost after the installation of the system. In addition, a fixed detection system is generally stationed in one correctional facility. After system is installed in one location, it is not easy to relocate the system in other locations, which limits the utilization as well as the cost efficiency of the system. In addition, in general, a fixed detection system is located within the correctional facility. Inmates may gain access to the fixed detection system and interrupt the operation of the system or damage the system, thus posing a great risk to the detection system.

While various aspects and alternative features are known in the field of communication monitoring, no one design has emerged that generally integrates all of the ideal features and performance characteristics as discussed herein.

BRIEF DESCRIPTION OF THE DRAWINGS/FIGURES

The accompanying drawings, which are incorporated herein and form a part of the specification, illustrate embodiments of the present disclosure and, together with the description, further serve to explain the principles of the disclosure and to enable a person skilled in the pertinent art to make and use the embodiments.

Figure 1:
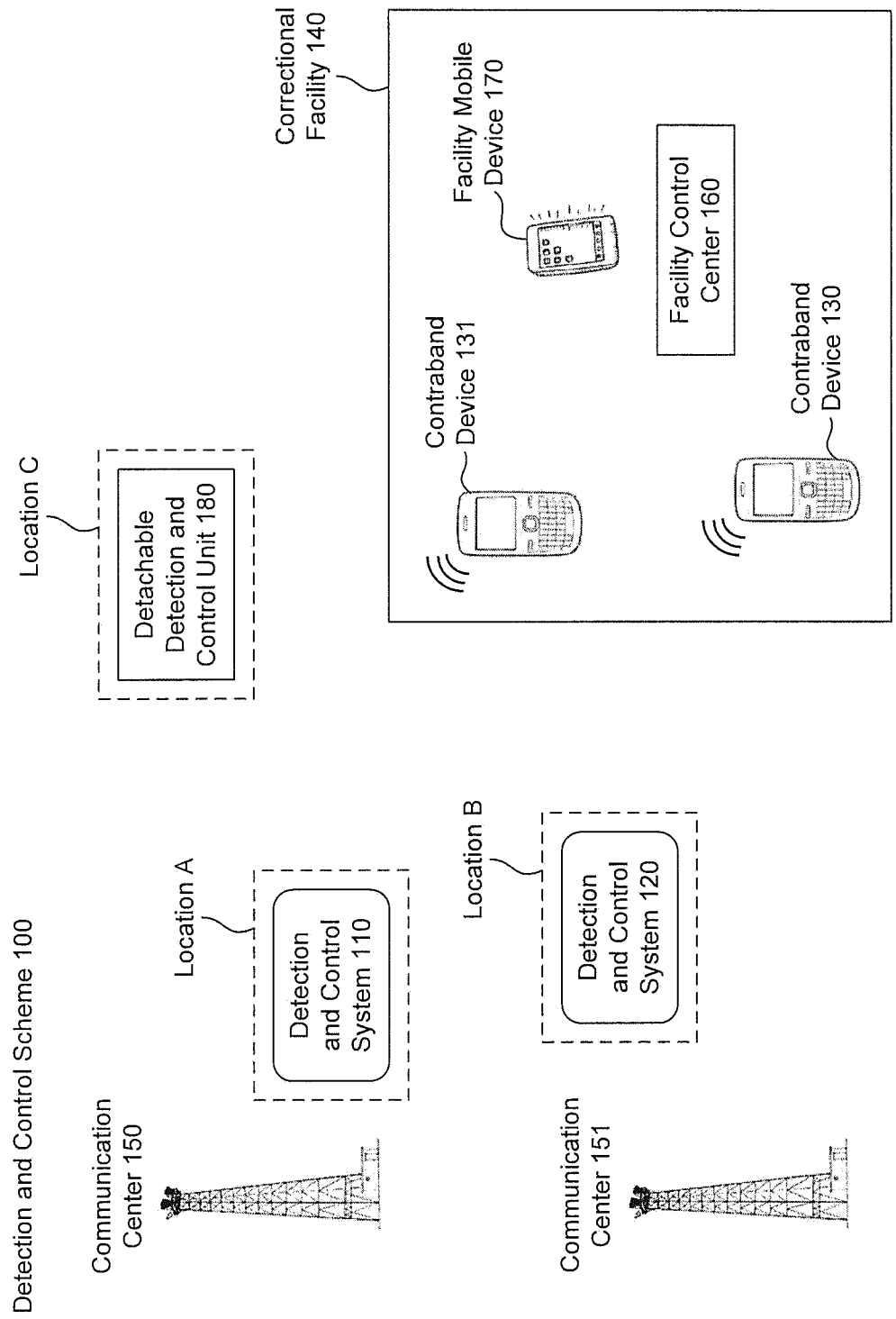
FIG. 1 illustrates a block diagram of a correctional facility and detection and control scheme for a correctional facility, according to some embodiments of the present disclosure.

The present disclosure will be described with reference to the accompanying drawings. In the drawings, like reference numbers indicate identical or functionally similar elements. Additionally, the left most digit(s) of a reference number identifies the drawing in which the reference number first appears.

DETAILED DESCRIPTION

Advances in communications technology have opened avenues for inmates to circumvent more traditional forms of monitoring that are typically available in correctional facilities. Maintaining the ability to ensure control and/or monitoring of communications from or to a controlled facility is, therefore, an important aspect to the security of the correctional facilities. With the advances in cellular communications technology, maintaining security becomes more difficult due to such issues as the smuggling of prohibited equipment into a monitored facility. Due to the small size of certain of the more recently-developed devices, such may avoid detection by more conventional search techniques including, but not limited to, walk through and manual metal detectors and even physical "pat-down" searches.

Therefore, correctional facilities have the need to detect and control the use of the smuggling or "contraband" wireless and cellular devices. Due to the small size of certain of the more recently developed devices and the ingenuity of violating parties, such contraband devices become very hard to detect or control by conventional searching techniques. The correctional facilities may choose to install a fixed detection system to detect and monitor the usage of the contraband devices within the facilities. However, such systems usually require a large upfront cost for the installation, hardware and infrastructure, and initial training of the staff. Due to their complexity and delicacy, such systems usually require regular maintenances. In addition, with the rapid advancement of communication technologies, such systems need to be upgraded frequently to keep up with the most advanced technologies utilized by the contraband devices. The cost of maintenance and upgrade further increases the total cost of operation of such fixed systems.

Moreover, once a fixed detection system is installed, the system is stationed within one facility/location. Without knowing the severity of the contraband device situation in a correctional facility, it may not be economical to invest a large amount of funding to install a fixed detection system before evaluating the need for such a system. Further, inmates may gain access to the detection system that is fixed in one location within the correctional facility and cause damage to the system or interrupt the operations of the system. Such potential risks may also greatly impact the utilization and security of the detection system.

In light of the above, the present disclosure provides details of a system and method for detecting, locating and disrupting a contraband device by utilizing a portable detection and control system. The portable detection and control system is configured to detect and locate contraband devices within a correctional facility. The portable detection and control system is also configured to actively disrupt the communication of the contraband devices to block the communications, intercept the communication information, and gain control of the contraband devices. The portable detection and control system can be self-contained and fully enclosed in a transportable casing, so that it can be moved from one location to another. More features of such as portable detection and control system are to be discussed in detail.

FIG. 1 illustrates a block diagram of a correctional facility and detection and control scheme 100 for a correctional facility, according to some embodiments of the present disclosure. The detection and control scheme comprises a detection and control system 110, a correctional facility 140, a communication center 150. The correctional facility 140 comprises a contraband device 130. In some embodiments, there are more than one contraband device in the correctional facility 140. In one embodiment, there is another contraband device 131 in the correctional facility 140. The detection and control unit 110 can be placed at location A outside the correctional facility 140 to detect the contraband device 130 in a "detection mode". The contraband device 130 is used by the inmates to communicate with outside network illegally. In some embodiments, the communication is carried out between the contraband device 130 and a communication center 150 outside the correctional facility 140. The communication center 150, in some embodiments, is a nearby telecommunication tower for the wireless network carrier of the contraband device. The communication between the communication 150 and the contraband device 130 can be carried out with different communication technologies such as, but not limited to, GSM, 2G-5G technologies, WCDMA, CDMA, TDMA, UMTS, WIMAX, WIFI, IBEACON, Bluetooth, LTE, 700 MHz to 2200 MHz or other frequency band communication technologies. The detection and control unit 110 is configured to detect the transmission of signals of the contraband device 130 using some or all the technologies described above. In some embodiments, the contraband device 130 can also communicate with another communication center (e.g. communication center 151).

In some embodiments, the detection and control system 110 is also configured to intercept the transmitted data from the detected contraband device 130 and extract information from the detected contraband device 130 based on the transmitted data. Such information includes, but is not limited to, hardware information, data usage information, and location information of the contraband device 130 when the contraband device is detected. In some embodiments, the hardware information further includes a hardware identification number of the contraband device 130 (e.g. an international mobile subscriber identity number (IMSI), an electronic serial number (ESN), a mobile device ID, etc.), a phone number of the contraband device, and a phone number that is communicating with the contraband device. In some embodiments, the data usage information includes the duration of data transmission conducted by the contraband device and the volume of the data transmitted by the contraband devices.

In some embodiments, the location information of the contraband device 130 is extracted by the detection and control system 110 by locating the contraband device 130 with a number of different positioning techniques. The positioning techniques include, but are not limited to, lateration (e.g. trilateration) and angulation (e.g. triangulation). Lateration is a process of estimating the location a contraband device given the distance measurements of the contraband device to a set of detection devices with known location. The location of the contraband device can be calculated and estimated by solving a set of equations based on the measured distances for each of the detection devices. Trilateration is a lateration process when a set of three detection devices with known locations are used to estimate the contraband device location. Angulation is a process of estimating the location of a contraband device given the measured angles between detecting devices at known locations and the contraband devices. The location of the contraband device can be calculated and estimated by solving a set of equations based on the measured angles for each of the detection devices. Triangulation is an angulation process when a set of three detection devices with known locations are used to estimate the contraband device location. In some embodiments, the distance of the contraband device to a detection device can be estimated by the Received Signal Strength Indicator (RSSI) of the detected signal, and the measured angle can be estimated by the Direction of Arrival (DOA) of the detected signal. Further, the detection and control system 110 can be configured to capture the motion of the contraband device 130 based on motion detection techniques. One example of such techniques is Doppler effect. In some embodiments, the detection and control system 110 is further able to track the location of the contraband device 130 during the time period when the contraband device is transmitting signal or is powered on.

In some embodiments, the detection and control system 110 is configured to generate detection event information for each detection event when the contraband device (e.g. contraband device 130) was detected. Such detection event information includes, but is not limited to, the date/time when the contraband device was detected, the duration of the contraband device being detected, and the location of the detection and control system 110 when the contraband device was detected. In some embodiments, the detection and control system 110 is configured to record the detection information (e.g. hardware information, location information, data usage information, and detection event information, etc.) in a memory.

In some embodiments, the detection and control system 110 is also configured to analyze the recorded detection information in a given period of time (i.e. all the detection event information, all the hardware information of the detected contraband devices, all the data usage information of the detected contraband devices, and all the location information of the detected contraband devices in the period of time) to generate a collection of detection parameters. In some embodiments, the detection parameters include, but are not limited to, the total number of contraband device detection events, the total number of detected contraband devices, the total time of contraband device usage, the total volume of the data transmitted by the contraband devices, the location and distribution of the contraband devices, and the time and frequency of the data transmission made by the contraband devices.

In some embodiments, the detection and control system 110 is also configured to generate a report for the detection of the contraband devices (e.g. the contraband device 130) in a given period of time. In some embodiments, the report for the detection of the contraband devices in a given period of time includes all the detection event information, all the hardware information of the detected contraband devices, all the data usage information of the detected contraband devices, and all the location information of the detected contraband devices in the period of time. In some embodiments, the report for the detection of the contraband devices includes the collection of detection parameters such as, but not limited to, the total number of contraband device detection events, the total number of detected contraband devices, the total time of contraband device usage, the total volume of the data transmitted by the contraband devices, the location and distribution of the contraband devices, and the time and frequency of the data transmission made by the contraband devices.

In some embodiments, the detection and control system 110 further includes a degree of severity (DOS) in the report for the detection of the contraband devices. In some embodiments, the degree of severity gives guidance to the jurisdiction on the severity of the contraband device usage. In some embodiments, the degree of severity is calculated based on the collection of detection parameters. In some embodiments, the degree of severity is a numerical number from 0 to 9, with 0 meaning no contraband device usage and 9 meaning the most severe contraband device usage. In some embodiments, the calculation of a degree of severity is based on a predetermined rule defined by the jurisdiction officers or the system administrator. In some embodiments, the predetermined rule defines a selection of detection parameters such as "p1" for the number of detected contraband devices, "p2" for the number of detection events, and "p3" for the total time of contraband device usage. The predetermined rule further defines a coefficient for each detection parameter (e.g. "c1" for "p1", "c2" for "p2", and "c3" for "p3"). The predetermined rule defines the relationship between the degree of severity (DAS) and the detection parameters by an specific algorithm (e.g. DAS=c1×p1+c2×p2+c3×p3). In some embodiments, the number of DAS is rounded to the nearest integer to give the final number of the degree of severity. A person of ordinary skill in the art would understand that the algorithm described in the current disclosure is only for illustration purpose and a different algorithm can be chosen or defined as needed.

In some embodiments, the jurisdiction officer and/or the system administrator refers to the report of the detection of the contraband devices with or without a DOS before taking further actions in fighting the contraband device usage. Such actions include, but are not limited to, extending the detection period, locating the detected contraband devices physically, instructing the detection and control system 110 to take disruption actions, and deciding whether to install a fixed detection system inside the correctional facility.

In some embodiments, the detection and control system 110 is also configured to actively disrupt the operation of the detected contraband device 130 in a "control mode". A number of methods can be used by the detection and control system 110 to disrupt the operation of contraband device 130 in the control mode. In one embodiment, the detection and control system 110 transmits a wideband jamming signal to the contraband device 130 to block the contraband device 130 from successfully communicating with the communication center 150. In one embodiment, the detection and control system 110 transmits a managed access request to the contraband device 130 and force the contraband device 130 to connect with the detection and control system 110. Upon a successful setup of a managed access with the contraband device 130, the detection and control system 110 is able to manage the contraband device 130 and applies usage rules determined by the jurisdiction offices. In one embodiment, the detection and control system 110 listens and records the communication transmitted to and from the contraband device 130. Such communication can include, but is not limited to, phone calls, emails, voice messages and text messages.

In some embodiments, the detection and control system 110 is fully enclosed in a transportable casing so that the system is portable. In some embodiments, the detection and control system 110 is carried around by human hand-holding. In some other embodiments, the detection and control system 110 can also be mounted on powered vehicles with or without human control. In yet some other embodiments, the detection and control system 110 can be mounted on unmanned aerial vehicles (UAVs).

In some embodiments, the detection and control system 110 is placed at location A outside the correctional facility 104 for the duration of a detection. In some embodiments, the location A is a location between the correctional facility and the communication center 150. In some other embodiments, the detection and control system 110 moves around from one location to another location for the duration of a detection. The detection and control system 110 collects detection information from multiple locations to improve the accuracy of the detection and cover a larger area of the correctional facility. In some embodiments, the location information of the detected contraband devices collected at multiple locations by the detection and control system 110 is analyzed using positioning technologies, such as triangulation, to improve the accuracy of the location of the detected contraband devices. In yet some other embodiments, the detection and control system 110 is moved to a location closer to the contraband device to improve the accuracy of the detection, and/or improve the efficiency for the disruption.

In some embodiments, the detection and control scheme 100 further comprises a detection and control system 120. In some embodiments, the detection and control system 120 is configured the same way as the detection and control system 110. Referring to FIG. 1, the detection and control system 120 is placed at location B outside the correctional facility 140. Location B is remote to location A. In some other embodiments, the detection and control scheme comprises more detection and control systems than the detection and control systems 110 and 120.

In some embodiments, the detection and control system 120 is configured to detect the contraband devices (e.g. the contraband device 130) within the correctional facility 140 independently from the detection and control system 110. In some other embodiments, the detection and control systems 110 and 120 communicate with each other before, during, and/or after the detection to share the detection information of each detected contraband device. In yet some other embodiments, there are more detection and control systems than systems 110 and 120. The sharing of detection information between multiple detection and control systems can be used for a variety of applications including, but not limited to, confirming detection events when more than one detection and control systems detect the same contraband device, locating the contraband device when location information for the contraband device are obtained from more than one detection and control system and used for lateration or angulation, and enhancing detection coverage when different detection and control systems are located in different locations around the correction facility.

In some embodiments, the detection and control systems 110 and 120 communicate with each other to disrupt the communication of the detected contraband devices (e.g. the contraband device 130). In one embodiment, the detection and control systems 110 and 120 located in different locations (i.e. location A and location B) send out jamming signals to the same detected contraband device and boost the strength of the jamming signals, therefore enhancing the disruption efficiency.

Referring to FIG. 1, in some embodiments, the detection and control scheme 100 further comprises a detachable detection and control unit 180. In some embodiments, the detachable detection and control unit 180 is part of the detection and control system 110 and is detachable from the casing of the detection and control system 110. The detachable detection and control unit 180 is configured to communicate with the detection and control system 110 wirelessly using technologies including, but not limited to, Bluetooth, WIFI, and radio frequency communication technologies. The detachable detection and control unit 180 is further configured to detect the transmission of signals from the contraband device 130. The detachable and control detection unit 180 is able to detect signals using technologies such as, but not limited to, GSM, 2G-5G technologies, WCDMA, CDMA, TDMA, UMTS, WIMAX, WIFI, IBEACON, Bluetooth, LTE, 700 MHz to 2200 MHz or other frequency band communication technologies.

In some embodiments, the detachable and control detection unit 180 is placed at location C outside the correctional facility 140 and location C is remote to location A. The detachable and control detection unit 180 detects transmission signals from the contraband device 130 and communicates the detection information of the detected contraband device with the detection and control system 110. The communication of data between the detachable detection and control unit 180 and the detection and control system 110 can be used for a variety of applications including, but not limited to: confirming detection events when both the detection and control system 110 and the detachable detection and control unit 180 detect the same contraband device; locating the contraband device when the contraband device location information from both the detection and control system 110 and the detachable detection and control unit 180 are used for positioning; and enhancing the detection coverage when the detachable detection and control unit 180 is placed at a different location than the detection and control system 110 around the correction facility 140.

In some embodiments, the detection and control systems 110 and the detachable detection and control unit 180 communicate with each other to disrupt the communication of the detected contraband devices (e.g. the contraband device 130). In one embodiment, the detection and control system 110 and the detachable detection and control unit 180 are located in different locations (i.e. location A and location C). Both the detection and control system 110 and the detachable detection and control unit 180 send out jamming signals to the same detected contraband device, which boosts the strength of the jamming signals received by the detected contraband device, therefore enhancing the disruption efficiency.

Referring to FIG. 1, in some embodiments, the correctional facility 140 further comprises a facility control center 160. In some embodiments, the facility control center 160 is configured to communicate with the detection and control system 130 wirelessly to receive the updated detection information of the detected contraband devices. In some embodiments, whenever the detection and control system 130 detects a contraband device usage, the detection and control system 130 sends an alert to the facility control center 160 and notify the facility administrators of the detection event. The alert includes information such as, but not limited to, the date/time of the detection event, the location of the detected contraband device, and other information of the detected contraband devices. In some embodiments, the facility control center 160 is configured to take instructions from the facility administrators and transmit the instructions to the detection and control system 130. Such instructions include, but are not limited to, initiate the control mode of the detection and control system 130 to disrupt the detected contraband devices, extend the detection period, relocate to the next target location for detection/disruption, pause the detection, generate a report of the detection, and terminate the detection.

In some embodiments, the correctional facility 140 further comprises a facility mobile device 170. The facility mobile device 170 can be carried around by the jurisdiction officers in the facility. In some embodiments, the facility mobile device 170 is configured to communicate with the facility control center 160. The communication between the facility control center 160 and the facility mobile device 170 includes, but is not limited to, voice messages, text messages, phone calls, emails, and video calls. In some embodiments, the facility mobile device 170 is configured to receive alerts from the facility control center 160 whenever a detection event occurs. The alerts include information such as, but not limited to, the date/time of the detection event, the location of the detected contraband device, and other information of the detected contraband devices. The facility mobile device 170 is also configured to receive instructions from the facility control center 160, such as, but not limited, conducting a physical search at a target location, patrolling a target region, and isolating a certain area of the facility. The facility mobile device 170 is further configured to send instructions or requests to the facility control center 160, such as, but not limited to, continuing detection of the contraband device, sending updated location of the detected contraband devices, initiating the disruption of the contraband devices, and improving the location accuracy to narrow down the search area. In some embodiments, the facility mobile device 170 is further configured to directly communicate with the detection and control system 110 to obtain information and send out instructions.

Figure 2:
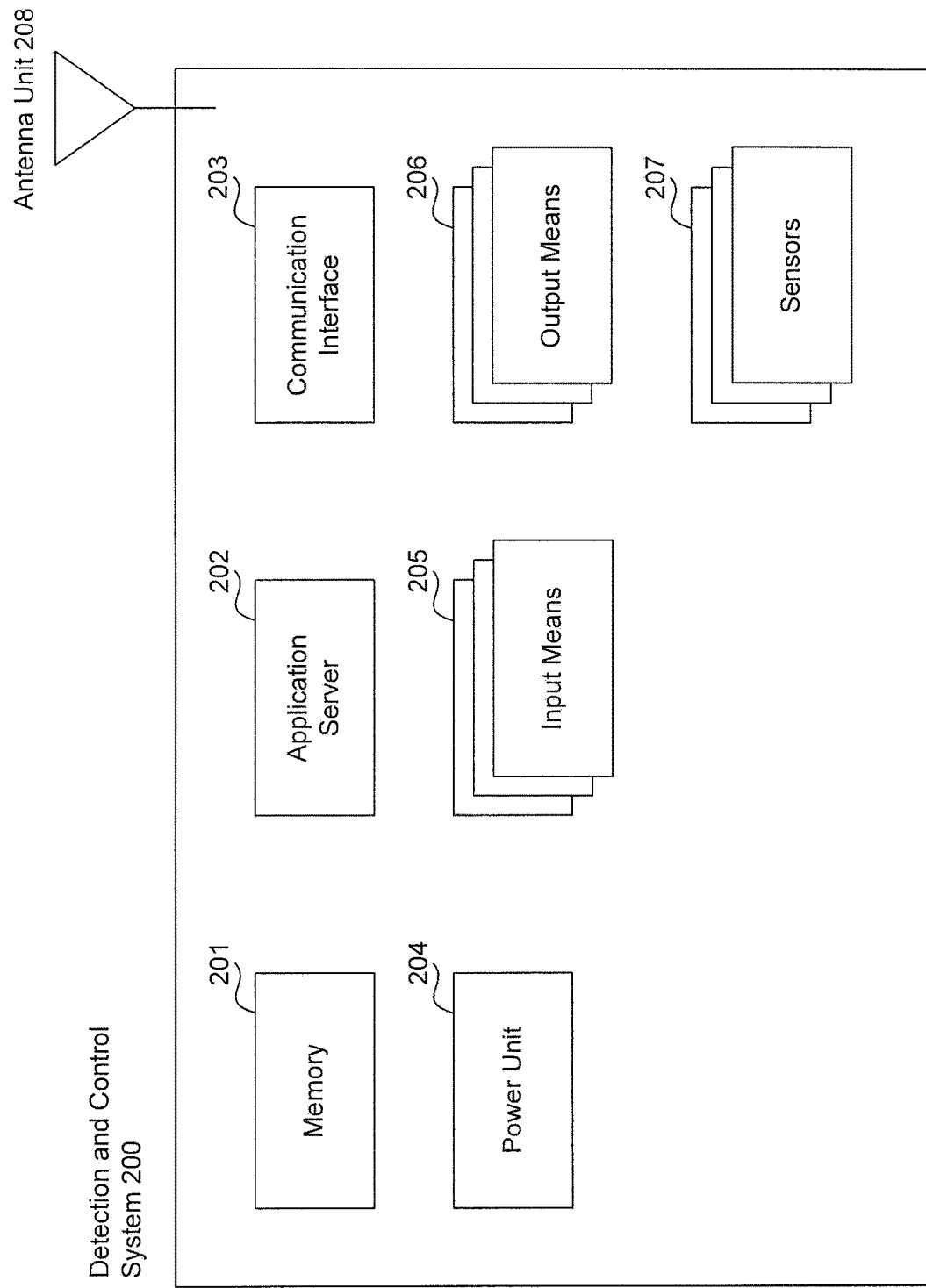
FIG. 2 illustrates a block diagram of an exemplary detection and control system, according to some embodiments of the present disclosure.

FIG. 2 illustrates a block diagram of an exemplary detection and control system 200, according to some embodiments of the present disclosure. The detection and control system 200 is an exemplary embodiment of the detection and control system 110 and the detection and control system 120 in FIG. 1. The detection and control system comprises a memory 201, an application server 202, a communication interface 203, a power unit 204, a plurality of input means 205, a plurality of output means 206, a plurality of sensors 207, and an antenna unit 208.

In some embodiments, the memory 201 stores the information and instructions necessary for the operations of the detection and control system 200. The information stored in memory 201 includes, but is not limited to, the detection event information for each detection event, the information extracted from the contraband devices in each detection event, the transmitted data intercepted by the communication interface 203 from the detected contraband devices, the reports generated by the detection and control system 200 for the detection of the contraband devices in a given period of time, the instructions received for the application server 202, the instructions generated by the application server 202, the data to be transmitted and the data received by the communication interface 203, the data received by the plurality of input means 205, and the data to be output by the plurality of output means 206.

In some embodiments, the application server 202 is the main processing unit for the detection and control system 200. The application server 202 is configured to execute a variety of tasks, such as, but not limited to, instructing the communication interface 203 to detect the contraband devices, generating detection event information whenever a detection event occurs (e.g. a contraband device is detected), instructing the communication interface to intercept transmitted data from the detected contraband device (e.g. contraband device 130), analyzing the transmitted data intercepted from the detected contraband device to extract the hardware information, data usage information, and location information of the detected contraband devices, recording the intercepted data from the detected contraband device in the memory 201, recording the detection event information and the information extracted from the detected contraband devices in the memory 201, performing positioning actions using positioning techniques to locate the contraband devices, generating instructions to perform disruption actions to disrupt the detected contraband devices, analyzing all the detection information (e.g. detection event information, hardware information, location information, data usage information, etc.) stored in the memory 201 to generate a report of the detection of the contraband devices, and executing instructions received from the plurality of input means 206. In some embodiments, the application server 202 is further configured to generate alerts for the facility control center 160 and/or the facility mobile device 170, generate location information of the detection and control system 200, and execute instructions received from the facility control center 160, the facility mobile device 170, and/or other detection and control system communicating with the detection and control system 200.

In some embodiments, the communication interface 203 includes one or more transceivers, transmitters, and/or receivers that communicate via the antenna unit 208. The communication interface 203 is configured to detect transmissions by the contraband device 130. Detection of the contraband device 130 transmissions includes reception of a transmission signal from an unauthorized communication via the antenna unit 208. For example, to detect an unauthorized communication, a receiver of the communication interface 203 may cycle through different frequencies bands and/or radio access technologies. In some embodiments, the communication interface 203 is further configured to output an RF signal during disruption operations. For example, a transmitter of the communication interface 203 can be configured to transmit an interference signal based on the received unauthorized communication. In some embodiments, the communication interface 203 is further configured to communicate with another detection and control system 120, the detachable detection and control unit 180, the facility control center 160, and the facility mobile device 170 to provide or receive information and/or instructions.

In some embodiments, the antenna unit 208 includes one or more antennas. The antenna unit 208 can include a distributed antenna system (DAS), in which a number of antenna elements are spaced apart from each other. The usage of a DAS can increase the detection accuracy and reliability by detecting the same area with multiple units that are spaced apart. The antenna unit 208 can also include one or more directional antennas which radiate or receive greater power in specific directions allowing for increased performance and reduced interference from unwanted sources. The usage of directional antennas can direct the detection and disruption to the target area (e.g. the correctional facility 140) without detecting or interfering unwanted areas (e.g. public areas).

In some embodiments, the power unit 204 provides power to the detection and control system 200 for its operations. In one embodiment, the power unit 204 is an A/C power adapter that directly connects to A/C power outlets outside the correctional facility 140. In another embodiment, the power unit 204 includes a battery that can be charged. In another embodiment, the power unit 204 includes a power generator that generates power from a number of sources such as, but not limited to, propane, diesel, gas, and solar energy. In yet another embodiment, the power unit 204 is a wireless charging adapter that receives power remotely from a charging base station.

In some embodiments, the plurality of input means include different input interfaces for the detection and control system 200 including, but not limited to, a keyboard, a touch screen, a microphone, and a camera. In some embodiments, the administrator of the detection and control system 200 can input information and/or instructions to the detection and control system 200 to complete specific tasks.

In some embodiments, the plurality of output means include different output interfaces for the detection and control system 200 including, but not limited to, a display for video, photo, and text output, and a loudspeaker for sound output.

In some embodiments, the plurality of sensors 207 include a biometric sensor and a position and motion sensor. The biometric sensor can be a fingerprint sensor that validates the identity of the user before granting the user an access to the detection and control system 110. In one embodiment, the biometric sensor communicates with the application server 202 and the memory 201 to verify the identity of the user. The biometric sensor obtains the biometric information of a requesting user, and sends the data to the application server 202. The application server 202 receives the biometric data from the biometric sensor 207, and compare the data from the biometric information database of all the authorized users stored in memory 201. If the biometric data from the requesting user matches one of the authorized users' biometric data, the application server grants access to the requesting user.

In some embodiments, the position and motion sensor includes devices such as, but not limited to, Global Positioning System (GPS) devices, indoor positioning systems (IPS) devices, accelerometers, and/or gyroscopes to determine position and motion. The position and motion data obtained by the position and motion sensor 207 for the detection and control system is sent to the application server 202 as part of the detection information for a detection event. The position and motion data is further used by the application server during the positioning process (e.g. triangulation) for the current location of the contraband device 130.

Figure 3:
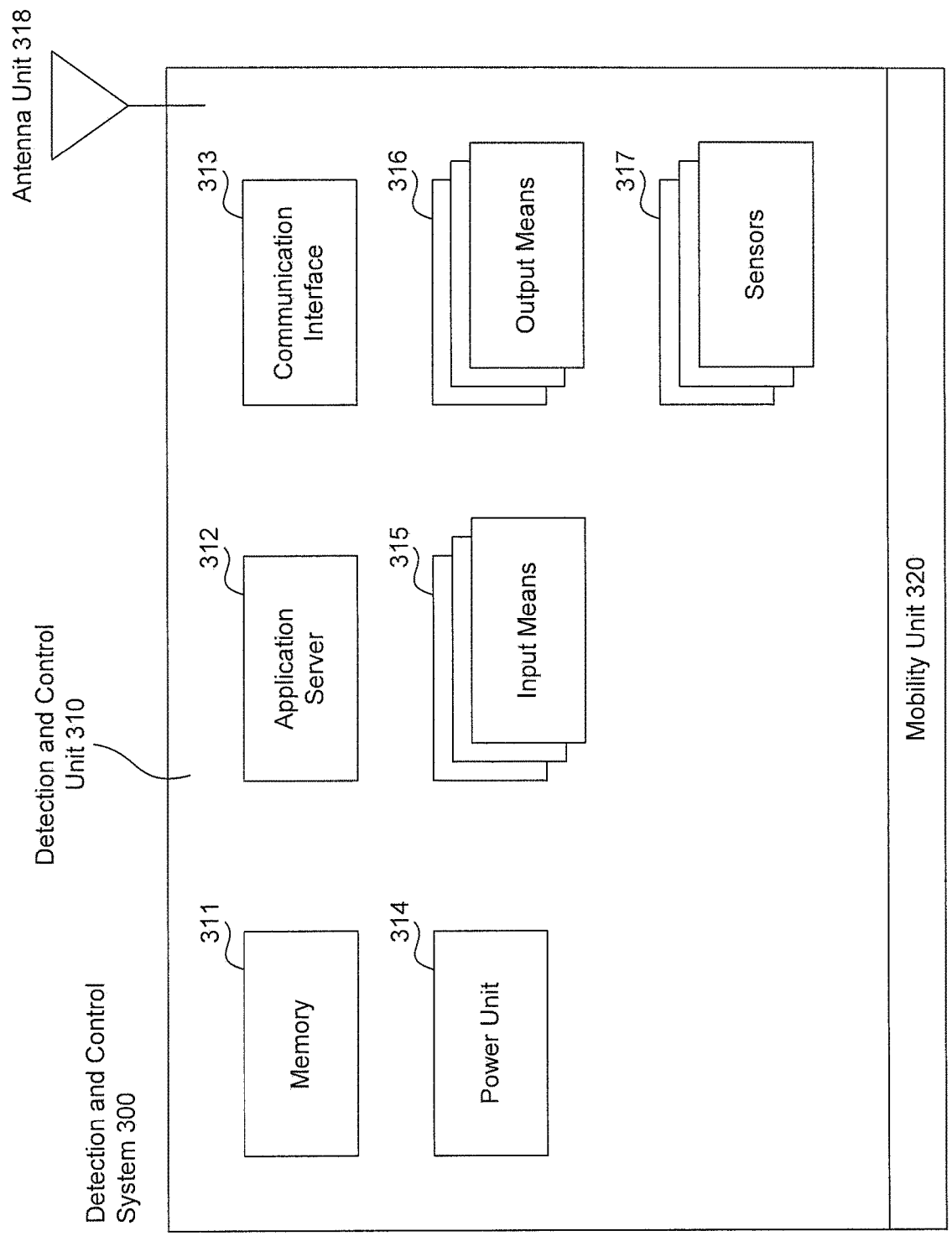
FIG. 3 illustrates a block diagram of an exemplary detection and control system, according to some embodiments of the present disclosure.

FIG. 3 illustrates a block diagram of an exemplary detection and control system 300, according to some embodiments of the present disclosure. The detection and control system 300 is another exemplary embodiment of the detection and control system 110 and the detection and control system 120 in FIG. 1. The detection and control system includes a detection and control unit 310 and a mobility unit 320. In some embodiments, the detection and control unit 310 further includes a memory 311, an application server 312, a communication interface 313, a power unit 314, a plurality of input means 315, a plurality of output means 316, a plurality of sensors 317, and an antenna unit 318.

In some embodiments, the memory 311 stores the information and instructions necessary for the operations of the detection and control system 300. The information stored in memory 311 includes, but is not limited to, the detection event information for each detection event, the information extracted from the contraband devices in each detection event, the transmitted data intercepted by the communication interface 313 from the detected contraband devices, the reports generated by the detection and control system 300 for the detection of the contraband devices in a given period of time, the instructions received for the application server 312, the instructions generated by the application server 312, the data to be transmitted and the data received by the communication interface 313, the data received by the plurality of input means 315, and the data to be output by the plurality of output means 316.

In some embodiments, the application server 312 is the main processing unit for the detection and control system 300. The application server 312 is configured to execute a variety of tasks, such as, but not limited to, instructing the communication interface 313 to detect the contraband devices, generating detection event information whenever a detection event occurs (e.g. a contraband device is detected), instructing the communication interface to intercept transmitted data from the detected contraband device (e.g. contraband device 130), analyzing the transmitted data intercepted from the detected contraband device to extract the hardware information, data usage information, and location information of the detected contraband devices, recording the intercepted data from the detected contraband device in the memory 311, recording the detection event information and the information extracted from the detected contraband devices in the memory 311, performing positioning actions using positioning techniques to locate the contraband devices, generating instructions to perform disruption actions for the detected contraband devices, analyzing all the detection information (e.g. detection event information, hardware information, location information, data usage information, etc.) stored in the memory 311 to generate a report of the detection of the contraband devices, and executing instructions received from the plurality of input means 206. In some embodiments, the application server 312 is further configured to generate alerts for the facility control center 160 and/or the facility mobile device 170, generate location information of the detection and control system 300, and execute instructions received from the facility control center 160, the facility mobile device 170, and/or other detection and control system communicating with the detection and control system 300.

In some embodiments, the communication interface 313 includes one or more transceivers, transmitters, and/or receivers that communicate via the antenna unit 318. The communication interface 313 is configured to detect transmissions by the contraband device 130. Detection of the contraband device 130 transmissions includes reception of a transmission signal of an unauthorized communication via the antenna unit 318. For example, to detect an unauthorized communication, a receiver of the communication interface 313 may cycle through different frequencies bands and/or radio access technologies. The communication interface 313 is further configured to output an RF signal during disruption operations. For example, a transmitter of the communication interface 313 can be configured to transmit an interference signal based on the received unauthorized communication. In some embodiments, the communication interface 313 is further configured to communicate with another detection and control system 120, the detachable detection and control unit 180, the facility control center 160, and the facility mobile device 170 to provide or receive information and/or instructions.

In some embodiments, the antenna unit 318 includes one or more antennas. In one embodiment, the antenna unit 318 is a distributed antenna system (DAS), in which a number of antenna elements are spaced apart from each other. The usage of a DAS can increase the detection accuracy and reliability by detecting the same area with multiple units that are spaced apart. In another embodiment, the antenna unit 318 can be one or more directional antennas which radiate or receive greater power in specific directions allowing for increased performance and reduced interference from unwanted sources. The usage of directional antennas can direct the detection and disruption to the target area (e.g. the correctional facility 140) without detecting or interfering unwanted areas (e.g. public areas). In some embodiments, a part or all of the antenna unit 318 can be located on the mobility unit 320.

In some embodiments, the power unit 314 provides power to the detection and control system 300 for its operations. In one embodiment, the power unit 314 is an A/C power adapter that directly connects to A/C power outlets outside the correctional facility 140. In another embodiment, the power unit 314 includes a battery that can be charged. In another embodiment, the power unit 314 includes a power generator that generates power from a number of sources such as, but not limited to, propane, diesel, gas, and solar energy. In yet another embodiment, the power unit 314 is a wireless charging adapter that receives power remotely from a charging base station. In a further embodiment, the power unit 314 receives the power from the mobility unit 320. In a further embodiment, the mobility unit 320 directly provides power for the operation of the detection and control system 300, and the power unit 314 is not necessary.

In some embodiments, the plurality of input means include different input interfaces for the detection and control system 300 including, but not limited to, a keyboard, a touch screen, a microphone, and a camera. In some embodiments, the administrator of the detection and control system 300 can input information and/or instructions to the detection and control system 300 to complete specific tasks.

In some embodiments, the plurality of output means include different output interfaces for the detection and control system 300 including, but not limited to, a display for video, photo, and text output, and a loudspeaker for sound output.

In some embodiments, the plurality of sensors 317 include a biometric sensor and a position and motion sensor. The biometric sensor can be a fingerprint sensor that validates the identity of the user before granting the user an access to the detection and control system 110. In one embodiment, the biometric sensor communicates with the application server 312 and the memory 311 to verify the identity of the user. The biometric sensor obtains the biometric information of a requesting user, and sends the data to the application server 312. The application server 312 receives the biometric data from the biometric sensor 317, and compare the data from the biometric information database of all the authorized users stored in memory 311. If the biometric data from the requesting user matches one of the authorized users' biometric data, the application server grants access to the requesting user.

In some embodiments, the position and motion sensor includes devices such as, but not limited to, Global Positioning System (GPS) devices, indoor positioning systems (IPS) devices, accelerometers, and/or gyroscopes to determine position and motion. The position and motion data obtained by the position and motion sensor 317 for the detection and control system is sent to the application server 312 as part of the detection information for a detection event. The position and motion data is further used by the application server during the positioning process (e.g. triangulation) for the current location of the contraband device 130.

In some embodiments, the mobility unit 320 is a manned vehicle, an unmanned vehicle, or a drone or unmanned aerial vehicles (UAVs). In some embodiments, the detection and control unit 310 is mounted on the mobility unit 320. In some embodiments, the control unit 310 is detachable from the mobility unit 320. In some other embodiments, a part of the detection and control unit 310 can be mounted on the mobility unit 320.

In some embodiments, the mobility unit 320 provide power to the detection and control unit 310 through wired electrical connection or wireless charging technology.

In some embodiments, the mobility unit 320 is a self-driving vehicle with its own processing unit, input/output means, communication interface, sensors, and memory unit. The mobility unit 320 can be configured to communicate with the detection and control unit 310 and transmit/receive information including, but not limited to, location of the mobility unit 320 and/or the detection and control unit 310, detection information of all the detection events, target location for detection and disruption, instructions for the mobility unit 320 to move to the target location, and instructions for the operations of the detection and control unit 310. In some embodiments, the mobility unit 320 works with the detection and control unit 310 in accordance to detect contraband devices, locate contraband devices from conducting detection at different locations, move to the detected contraband devices, and disrupt the operation of the detected contraband devices. In some embodiments, the operation of the detection and control system 300 is fully automated.

Figure 4:
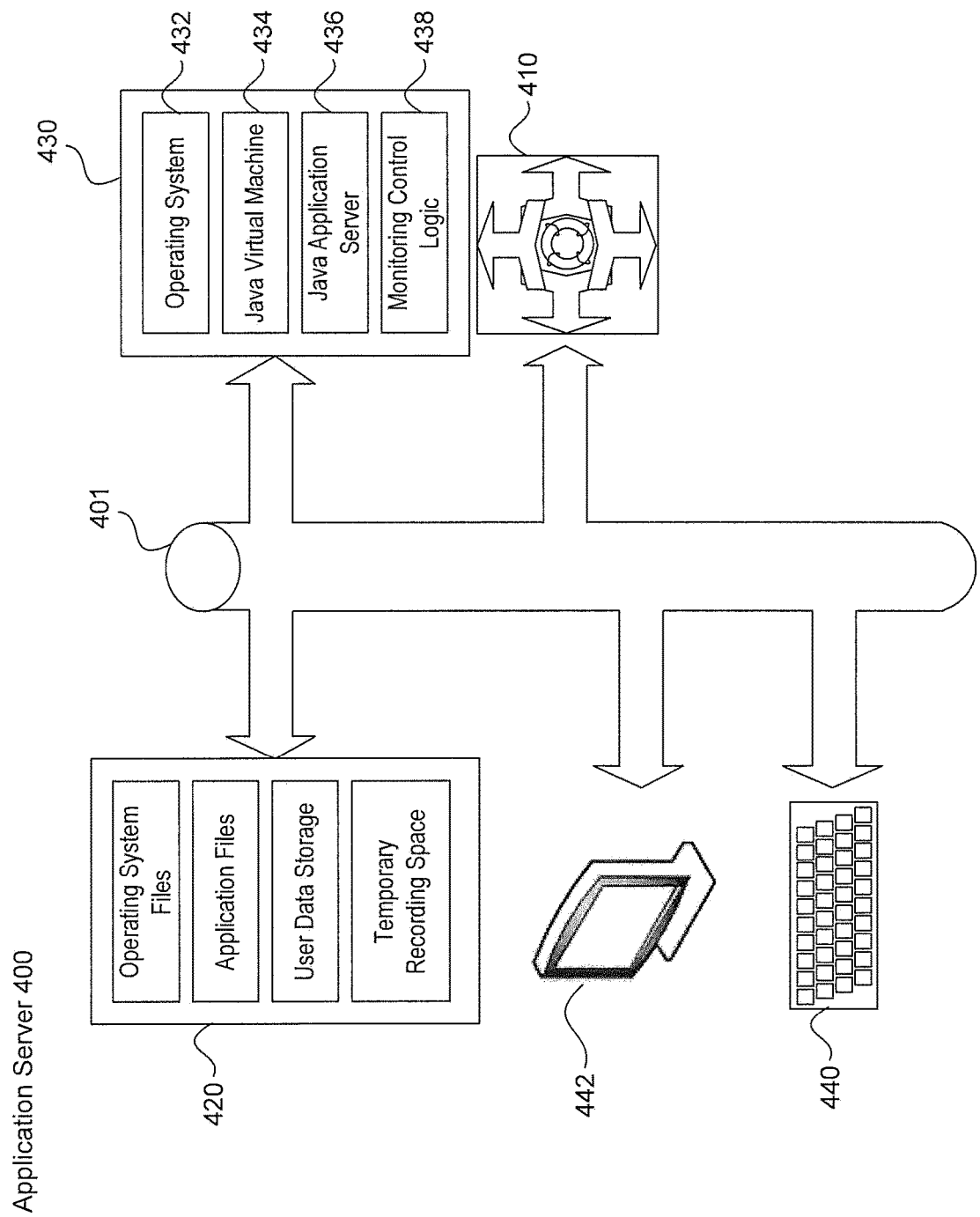
FIG. 4 illustrates a block diagram of an exemplary application server, according to some embodiments of the present disclosure.

FIG. 4 illustrates a block diagram of an exemplary application server 400, according to some embodiments of the present disclosure. The application server 400 is an exemplary embodiment of the application server 202 in FIG. 2 and the application server 312 in FIG. 3.

Application server 400 consists of any number of servers, and functions as the primary logic processing center in the detection and control system 200 and the detection and control system 300. Application server 400 is configured to execute a variety of tasks, such as, but not limited to, initiating and coordinating the detection of the contraband devices, analyzing the data received from the detected contraband devices to obtain the information of the detected contraband devices, recording information into and fetching information from the memory of the detection and control system, performing positioning actions using positioning techniques to locate the contraband devices, generating instructions to perform disruption actions for the detected contraband devices, analyzing the detection information stored in the memory of the detection and control system, generating a report of the detection of the contraband devices, and executing instructions received from different sources. In some embodiments, the application server 400 is further configured to generate alerts for the facility control center 160 and/or the facility mobile device 170, generate location information of the detection and control system, and execute instructions received from the facility control center 160, the facility mobile device 170, and/or other detection and control system communicating with the detection and control system.

Application server 400 includes one or more central processing units (CPU) 410 connected via a bus 401 to several other components. One of such components can be an internal data storage 420. This data storage 420 is non-volatile storage, such as one or more magnetic hard disk drives (HDDs) and/or one or more solid state drives (SSDs). Data storage 420 is used to store a variety of important files, documents, or other digital information, such as operating system files, application files, and/or temporary recording space.

Application server 400 also includes system memory 430. System memory 430 is preferably faster and more efficient than Data storage 420, and is configured as random access memory (RAM) in an embodiment. System memory 430 contains the runtime environment of application server 400, storing temporary data for any of operating system 432, java virtual machine 434, java application server 436, and detection and monitoring control logic 438.

In some embodiments, referring to FIG. 4, the application server 400 can have its own input and output methods. For example, the input method can be a keyboard and/or mouse 440, and the output method can be a monitor 442.

Figure 5:
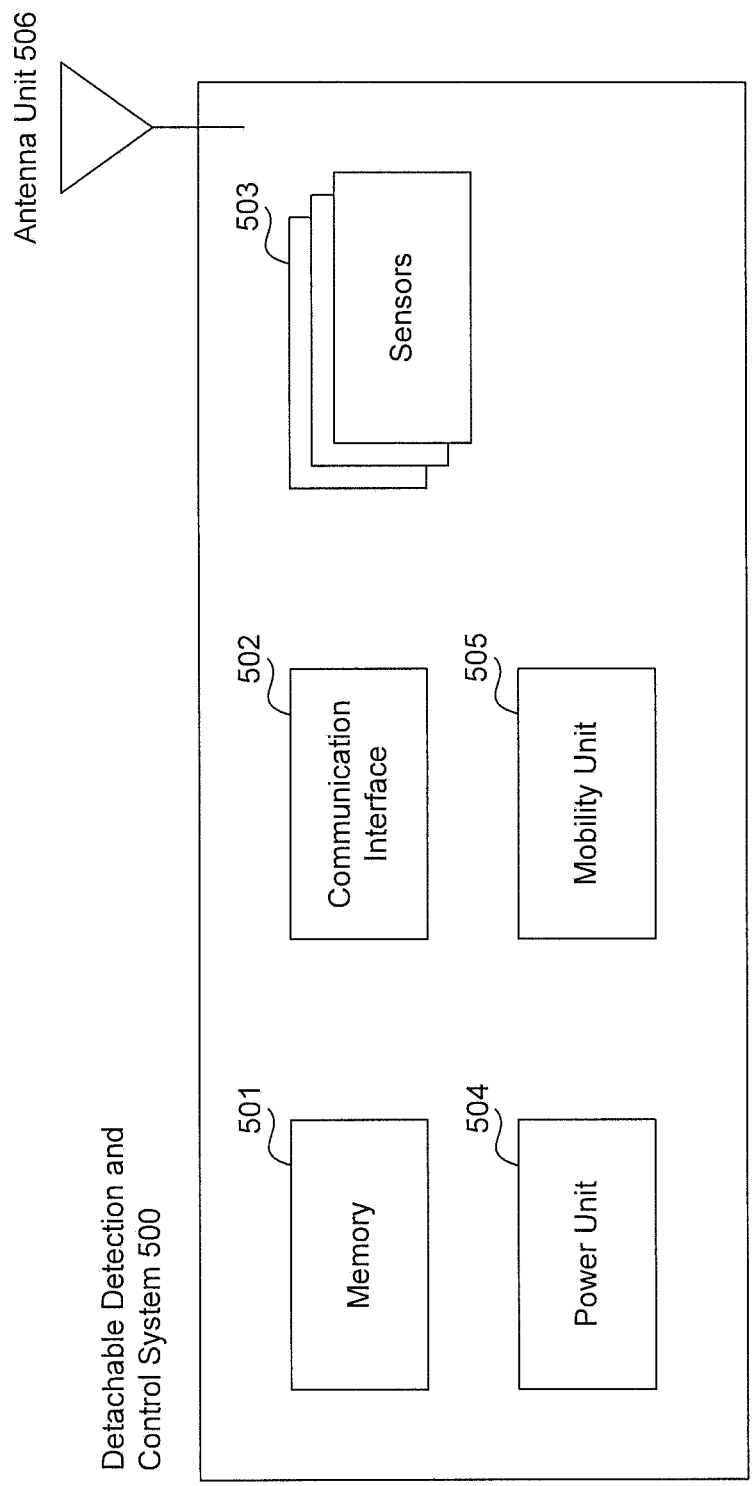
FIG. 5 illustrates a block diagram of an exemplary detachable detection and control unit, according to some embodiments of the present disclosure.

FIG. 5 illustrates a block diagram of an exemplary detachable detection and control unit 500, according to some embodiments of the present disclosure. The detachable detection and control unit 500 is an exemplary embodiment of the detachable detection and control unit 180 in FIG. 1. In some embodiments, the detachable detection and control unit 500 is part of the detection and control system 110 and is detachable from the casing of the detection and control system. The detachable detection and control unit 500 is configured to communicate with the detection and control system 110 wirelessly using technologies including, but not limited to, Bluetooth, WIFI, and radio frequency communication technologies. The detachable detection and control unit 500 is further configured to detect the transmission of signals from the contraband devices (e.g. contraband device 130). The detachable detection and control unit 500 is able to detect signals using technologies such as, but not limited to, GSM, 2G-5G technologies, WCDMA, CDMA, TDMA, UMTS, WIMAX, WIFI, IBEACON, Bluetooth, LTE, 700 MHz to 2200 MHz or other frequency band communication technologies. The detachable detection and control unit 500 is further configured to perform disruption actions to the detected contraband devices upon receiving instructions from the application server 400, according to some embodiments.

In some embodiments, the detachable detection and control unit 500 includes a communication interface 502, a plurality of sensors 503, and an antenna unit 506. In some embodiments, the detachable detection and control unit 500 further includes a memory 501 and a power unit 504. In some embodiments, the detachable detection and control unit 500 further includes a mobility unit 505.

The communication interface 502 includes one or more transceivers, transmitters, and/or receivers that communicate via the antenna unit 506. The communication interface 502 is configured to detect transmissions by the contraband device 130. Detection of the contraband device 130 transmissions includes reception of a transmission signal of an unauthorized communication via the antenna unit 506. For example, to detect an unauthorized communication, a receiver of the communication interface 502 may cycle through different frequencies bands and/or radio access technologies. In some embodiments, the communication interface 502 is further configured to output an RF signal during disruption operations. For example, a transmitter of the communication interface 502 can be configured to transmit an interference signal based on the received unauthorized communication. The communication interface 502 is further configured to communicate with the detection and control system 110 to transmit information and/or instructions.

In some embodiments, the antenna unit 506 includes one or more antennas. In one embodiment, the antenna unit 506 is a distributed antenna system (DAS), in which a number of antenna elements are spaced apart from each other. The usage of a DAS can increase the detection accuracy and reliability by detecting the same area with multiple units that are spaced apart. In another embodiment, the antenna unit 506 includes one or more directional antennas which radiate or receive greater power in specific directions allowing for increased performance and reduced interference from unwanted sources. The usage of directional antennas can direct the detection and disruption to the target area (e.g. the correctional facility 140) without detecting or interfering unwanted areas (e.g. public areas).

In some embodiments, the plurality of sensors 503 include a position and motion sensor. The position and motion sensor includes devices such as, but not limited to, Global Positioning System (GPS) devices, indoor positioning systems (IPS) devices, accelerometers, and/or gyroscopes to determine position and motion. The position and motion data obtained by the position and motion sensor 503 for the detachable detection and control unit 500 is sent to the application server 400 as part of the detection information for a detection event. The position and motion data is further used by the application server 400 during the positioning process (e.g. triangulation) for the current location of the detected contraband device 130.

In some embodiments, the power unit 504 provides power to the detachable detection and control unit 500 for its operations. In one embodiment, the power unit 504 is an A/C power adapter that directly connects to A/C power outlets outside the correctional facility 140. In another embodiment, the power unit 504 includes a battery that can be charged. In another embodiment, the power unit 504 is a wireless charging adapter that receives power remotely from a charging base station. In a further embodiment, the power unit 504 receives the power from the mobility unit 505. In a further embodiment, the mobility unit 505 directly provides power for the operation of the detachable detection and control unit 500, and the power unit 504 is not necessary.

In some embodiments, the mobility unit 505 is a self-driving vehicle or an unmanned aerial vehicle with its own processing unit, input/output means, communication interface, sensors, and memory unit. The mobility unit 505 can be configured to communicate with the detection and control unit 310 and transmit information including, but not limited to, location of the mobility unit 505 and/or the detachable detection and control unit 500, detection information of all the detection events, target location for detection and disruption, instructions for the mobility unit 505 to move to the target location, and instructions for the operations of the detachable detection and control unit 500. In some embodiments, the mobility unit 505 cooperates with the detection and control unit 310 or the detection and control system 200 to detect contraband devices, locate contraband devices from conducting detection at different locations, move to the detected contraband devices, and disrupt the operation of the detected contraband devices.

Figure 6:
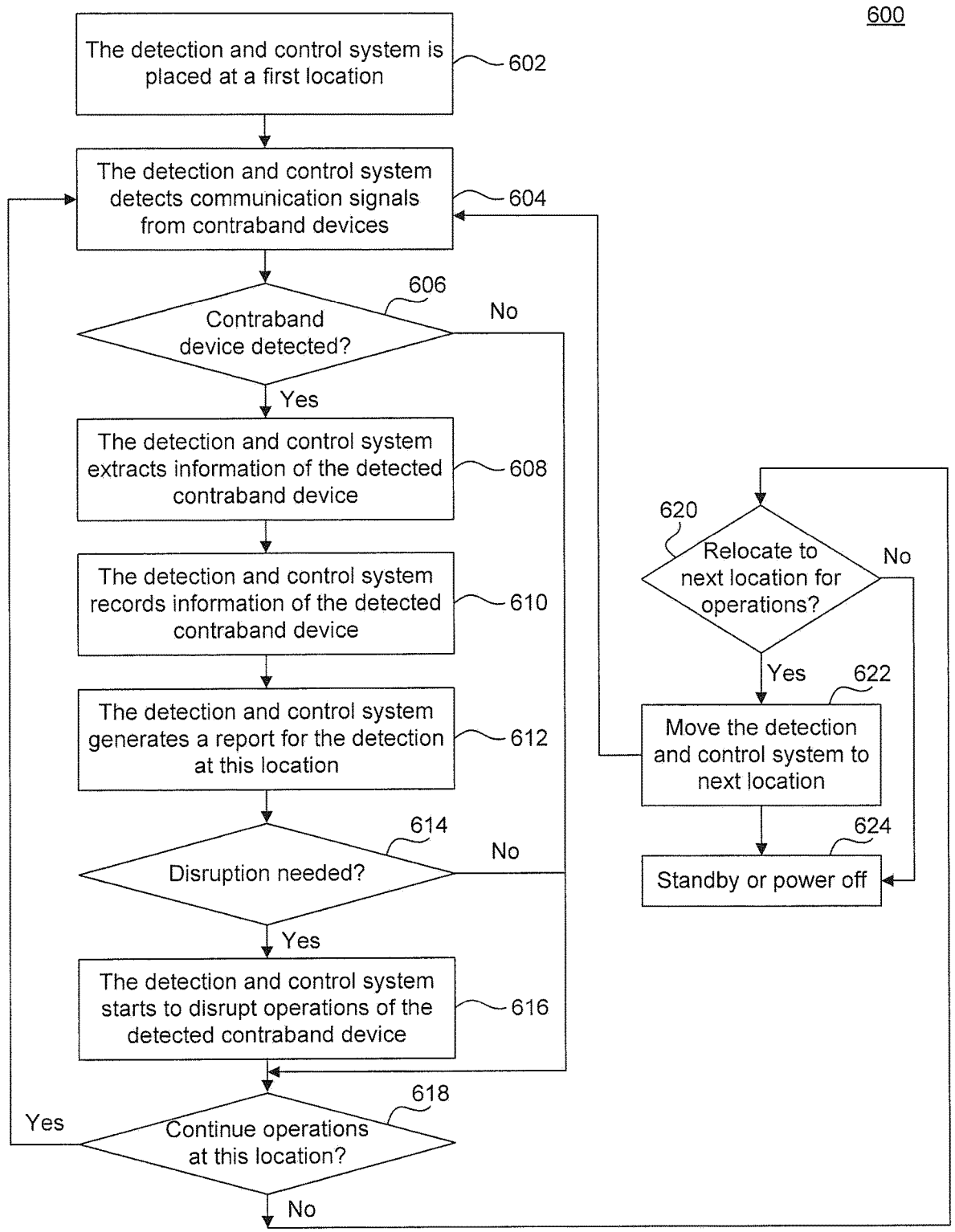
FIG. 6 illustrates a flow chart for an exemplary method to operate the detection and control system, according to some embodiments.

FIG. 6 illustrates a flow chart for an exemplary method 600 to operate the detection and control system 110, according to some embodiments. At step 602, the detection and control system 110 is placed at a first location outside the correctional facility 140. Referring to FIG. 1, in some embodiments, the first location (e.g. Location A) is between the correctional facility 140 and a nearby communication center 150. Such a location set up is favorable in detecting the signal transmission between the contraband device (e.g. contraband device 130) and the correctional facility, because the detection and control system 110 is located close to the signal transmission pathway between the contraband device 130 and the communication center 150.

At step 604, the detection and control system 110 detects communication signals from the contraband devices in the correctional facility. In some embodiments, the detection is done by the communication interface and the antenna unit of the detection and control system. In some embodiments, the antenna unit is a DAS system to improve the detection accuracy and reliability. In some other embodiments, the antenna unit includes one or more directional antennas directed to the correctional facility 140 to avoid detecting unwanted areas. When searching for a contraband device, the detection and control system 110 enables a receiver to receive transmissions from contraband devices. The detection and control system 110 may focus on specific types of transmissions such as GSM, CDMA, LTE, or other cellular transmissions and/or may rotate through a variety of frequencies and transmission types including, for example, cellular transmissions and WIFI signals of a specific type.

At step 606, the detection and control system 110 conducts the detection until a contraband device is detected, or when a pre-determined time period for detection ends. If a contraband device is not detected within the pre-determined time period, the system operation jumps to step 618 to determine if the operation needs to continue. If a contraband device is detected, the system proceeds to step 608.

At step 608, the detection and control system 110 perform actions to extract information of the detected contraband device (e.g. contraband device 130). The information of the contraband device 130 to be extracted includes, but is not limited to, hardware information, data usage information, and location information of the contraband device 130 when the contraband device is detected. In some embodiments, the hardware information further includes a hardware identification number of the contraband device 130 (e.g. an international mobile subscriber identity number (IMSI), an electronic serial number (ESN), a mobile device ID, etc.), a phone number of the contraband device, and a phone number that is communicating with the contraband device. In some embodiments, the data usage information includes the duration of data transmission conducted by the contraband device and the volume of the data transmitted by the contraband devices. In some embodiments, the detection and control system 110 utilizes one or more positioning techniques (e.g. lateration and angulation) to obtain the location of the detected contraband devices. In some embodiments, at step 608, the detection and control system 110 further intercepts the communication transmitted from and to the detected contraband device. In some embodiments, the detection and control system 110 sends an alert to the facility control center 160 to inform the correctional facility 140 of the detection event. In some embodiments, the detection and control system 110 further generates detection event information for the detected contraband device. Such detection event information includes, but is not limited to, the date/time when the contraband device was detected, the duration of the contraband device being detected, and the location of the detection and control system 110 when the contraband device was detected.

At step 610, the detection and control system 110 records the extracted information for the detected contraband device at step 608 to a memory. In addition to the information extracted at step 608, the detection and control system 110 can also record information such as, but not limited to, the date/time when the contraband device was detected, the duration of the contraband device being detected, and the location of the detection and control system 110 when the contraband device was detected.

At step 612, the detection and control system 110 generates a report for all the detection events and all the detected contraband device during a given period of time. In some embodiments, the report contains information such as, but not limited to the total number of contraband device detection events, the total number of detected contraband devices, the total time of contraband device usage, the total volume of the data transmitted by the contraband devices, the location and distribution of the contraband devices, and the time and frequency of the data transmission made by the contraband devices. In some embodiments, based on the extracted data from all the detected contraband devices and the detection event information for all the detected devices, the detection and control system 110 generates a degree of severity in the report to give guidance to the facility administrators on the severity of the contraband device usage in the correctional facility.

At step 614, the detection and control system 110 listens for input or instruction to activate control mode and perform disruption to the contraband devices. If the disruption is needed, the detection and control system 110 jumps to step 616. If no disruption is needed, the detection and control system 110 jumps to step 618. In one embodiment, the input and/or instruction comes from the detection and control system 110 administrator via one of the input method. In one embodiment, the input and/or instruction comes from the facility administrator via the facility control center 160, or from the facility officer via the facility mobility device 170.

In some embodiments, at step 614, the detection and control system 110 have pre-determined instructions to automatically activate control mode and perform disruption to the contraband devices. In these embodiment, the detection and control system 110 can automatically activate control mode when the total number of detection events exceeds a pre-determined number, or the total number of detected contraband devices exceeds a pre-determined number, or the total data transmitted by the contraband devices exceeds a pre-determined amount.

At step 618, the detection and control system 110 listens for input or instruction on whether to continue the detection at the current location. If continued detection is needed, the detection and control system 110 jumps back to step 604 to continue the detection. If continued detection at current location is not needed, the detection and control system 110 jumps to step 620. In one embodiment, the input and/or instruction comes from the detection and control system 110 administrator via one of the input method. In one embodiment, the input and/or instruction comes from the facility administrator via the facility control center 160, or from the facility officer via the facility mobility device 170.

In some embodiments, at step 618, the detection and control system 110 have pre-determined instructions to automatically determine whether continued detection is needed at the current step. In these embodiment, the detection and control system 110 can automatically continue the detection when the total number of detection events exceeds a pre-determined number, or the total number of detected contraband devices exceeds a pre-determined number, or the total data transmitted by the contraband devices exceeds a pre-determined amount. In these embodiments, the detection and control system 110 can still listen for input and/or instructions and alter its operations based on the input and/or instructions.

At step 620, the detection and control system 110 listens for input or instructions on whether to relocate to another location. If relocation is needed, the detection and control system 110 jumps to step 622. If relocation is not needed, the detection and control system 110 jumps to step 624. In one embodiment, the input and/or instruction comes from the detection and control system 110 administrator via one of the input method. In one embodiment, the input and/or instruction comes from the facility administrator via the facility control center 160, or from the facility officer via the facility mobility device 170. In some embodiments, at step 620, the detection and control system 110 have pre-determined instructions to automatically determine whether a relocation is needed.

At step 622, the detection and control system 110 is moved to the next location for detection and disruption. In some embodiments, the detection and control system 110 is carried to the next location by human, manned vehicles, unmanned vehicles, and/or unmanned aerial vehicles. After relocation, the detection and control system 110 can jump back to step 604 for more detection and/or disruption.

At step 624, the detection and control system 110 is in a standby or power off state, waiting for input and/or instructions to wake up or power on for operations. In one embodiment, the input and/or instruction comes from the detection and control system 110 administrator via one of the input method. In one embodiment, the input and/or instruction comes from the facility administrator via the facility control center 160, or from the facility officer via the facility mobility device 170.

In some embodiments, at step 624, the detection and control system 110 have pre-determined instructions to automatically wake up or power on. In one embodiment, the detection and control system 110 automatically wakes up or powers on when a pre-determined standby or power off time period ends.

Figure 7:
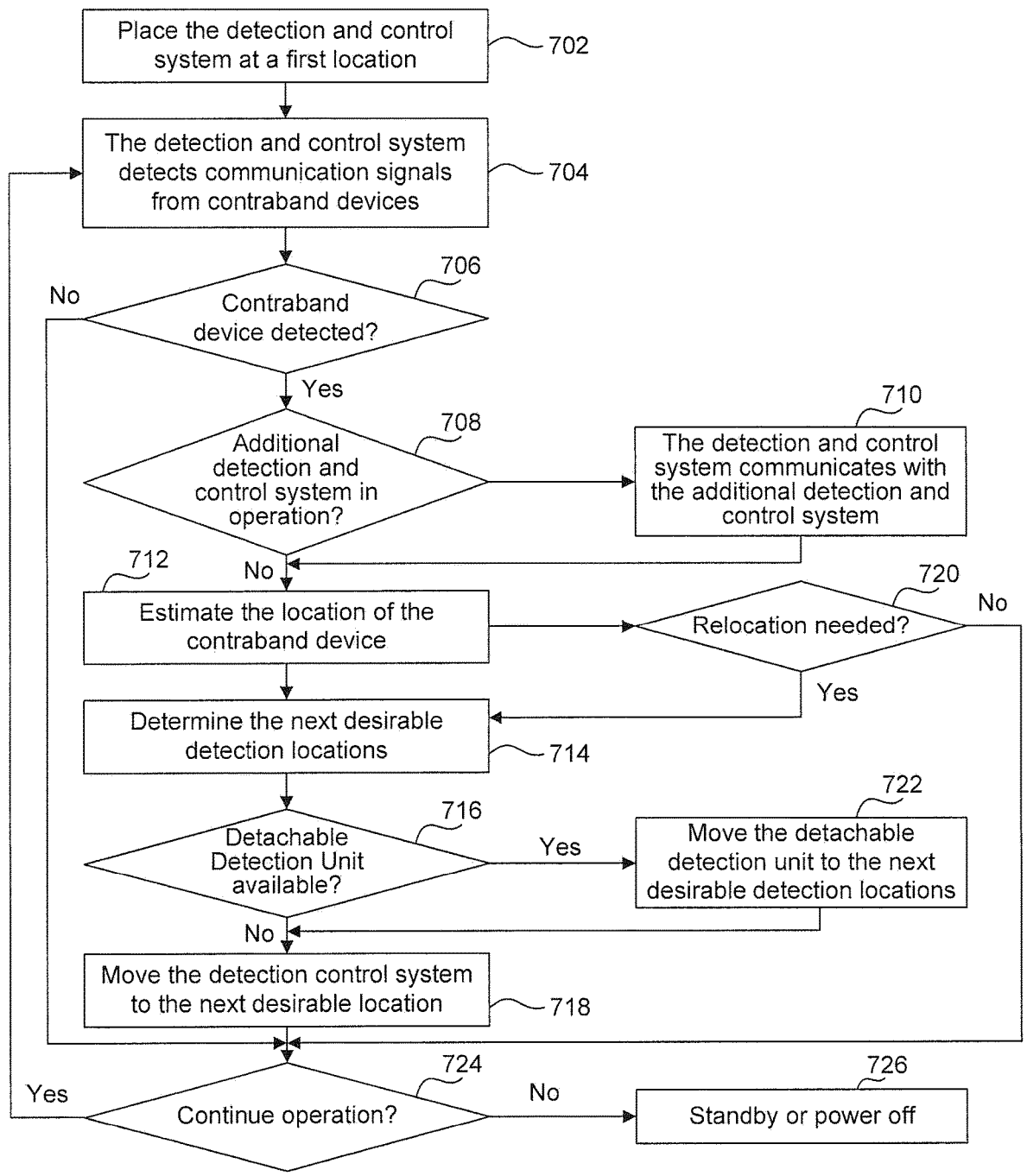
FIG. 7 illustrates a flow chart for an exemplary method to operate the detection and control system for detecting and locating contraband devices, according to some embodiments.

FIG. 7 illustrates a flow chart for an exemplary method 700 to operate the detection and control system 110 for detecting and locating contraband devices, according to some embodiments.

At step 702, the detection and control system 110 is placed at a first location outside the correctional facility 140. Referring to FIG. 1, in some embodiments, the first location (e.g. Location A) is between the correctional facility 140 and a nearby communication center 150. Such a location set up is favorable in detecting the signal transmission between the contraband device (e.g. contraband device 130) and the correctional facility, because the detection and control system 110 is located close to the signal transmission pathway between the contraband device 130 and the communication center 150.

At step 704, the detection and control system 110 detects communication signals from the contraband devices in the correctional facility. In some embodiments, the detection is done by the communication interface and the antenna unit of the detection and control system. In some embodiments, the antenna unit is a DAS system to improve the detection accuracy and reliability. In some other embodiments, the antenna unit includes one or more directional antennas directed to the correctional facility 140 to avoid detecting unwanted areas. When searching for a contraband device, the detection and control system 110 enables a receiver to receive transmissions. The detection and control system 110 may focus on specific types of transmissions such as GSM, CDMA, LTE, or other cellular transmissions and/or may rotate through a variety of frequencies and transmission types including, for example, cellular transmissions and WIFI signals of a specific type.

In some embodiments, at step 704, a detachable detection and control unit 180 is detached from the detection and control system 110 and placed to another location (e.g. location C) that is outside the correctional facility and remote to location A. This detachable detection and control unit 180 can detect communication signals from the contraband devices in the correctional facility. In some embodiments, the detection is done by the communication interface and the antenna unit of the detachable detection and control unit 180. In some embodiments, the detachable detection and control unit 180 communicates with the detection and control system 110 and transmits information and/or instructions.

At step 706, the detection and control system 110 conducts the detection until a contraband device is detected, or when a pre-determined time period for detection ends. If a contraband device is not detected within the pre-determined time period, the system operation jumps to step 724 to determine if the operation needs to continue. If a contraband device is detected, the system proceeds to step 708.

At step 708, referring to FIG. 1, the detection and control system 110 finds out whether another detection and control system (e.g. detection and control system 120) is in operation for the correctional facility 140. If another detection and control system is in operation, the detection and control system 110 jumps to step 710. If another detection and control system is not available or not in operation, the detection and control system 110 jumps to step 712. In some embodiments, the additional detection and control system 120 is located at a location B outside the correctional facility 140 but remote to location A where the detection and control system 110 is located.

At step 710, the detection and control system 110 communicates with the additional detection and control system 120 to transmit information and/or instructions. In some embodiments, such information includes, but is not limited to, the detection information for all detection events, the information obtained from all the detected contraband devices, the location and motion information for the detection and control system, and the reports generated during the detection period. In some embodiments, there are more detection and control systems than the detection and control system 110 and 120. The sharing of detection information between multiple detection and control systems can be used for a variety of applications including, but not limited to, confirming detection events when more than one detection and control systems detect the same contraband device, locating the contraband device when location information for the contraband device are obtained from more than one detection and control system and used for lateration and/or angulation, and enhancing detection coverage when different detection and control systems are located in different locations around the correction facility.

At step 712, the detection and control system 110 estimates the location of the detected contraband devices based on one or more positioning techniques, such as, but not limited to, lateration and angulation. Depending on different factors such as, but not limited to, the detection ability of the detection and control system 110, the relative distance between the contraband device and the detection and control system 110, and the positioning technique used to for locating the contraband device, the estimated location of the contraband device can have a certain degree of accuracy. Due to the different degrees of accuracy, the estimated location of the contraband device can be a big region that can be narrowed down.

At step 720, the detection and control system 110 determines whether relocation is needed. If a relocation is needed, the detection and control system 110 jumps to step 714. If a relocation is not needed, the detection and control system 110 jumps to step 724. In some embodiments, whether relocation is needed is determined by input and/or instructions received by the detection and control system 110. In some embodiments, the input and/or instruction comes from the detection and control system 110 administrator via one of the input method. In one embodiment, the input and/or instruction comes from the facility administrator via the facility control center 160, or from the facility officer via the facility mobility device 170. In some embodiments, the detection and control system 110 have pre-determined instructions to automatically determine whether a relocation is needed.

At step 714, the detection and control system 110 determines the next desirable detection location or locations. In some embodiments, the determination of the next desirable detection location or locations is conducted automatically by the detection and control system 110 based on the detection information of the contraband devices. The next desirable detection location or locations can be determined based on a variety of reasons such as, but not limited to, the need to improve the estimation accuracy of the contraband device location, the need to improve the coverage of detection within the correctional facility, and the need to focus the detection on a certain area of the correctional facility. In some embodiments, the next desirable locations can be input manually from the detection and control system 110 administrator via one of the input method. In one embodiment, the next desirable locations can be input manually from the facility administrator via the facility control center 160, or from the facility officer via the facility mobility device 170.

At step 716, the detection and control system 110 determines if one or more detachable detection and control unit 180 is available or in operation. If there are one or more detachable detection and control unit 180 available or in operation, the detection and control system 110 jumps to step 722. If there is no detachable detection and control unit 180 available or in operation, the detection and control system 110 jumps to step 718.

At step 722, the detachable detection and control unit 180 is moved to the next desirable locations for the detachable detection and control unit 180 determined at step 714. In some embodiments, the detachable detection and control unit 180 is moved by human, manned vehicles, unmanned vehicles, and/or UAV. In some embodiments, the detachable detection and control unit 180 is moved by its own mobility unit. In some embodiments, the mobility unit of the detachable detection and control unit 180 has an autonomous mobility unit (e.g. an autonomous car, a drone or an UAV) that receives instructions directly from the detection and control system 110 and move to the next desirable location. Advantages of having a drone or an UAV to move the detachable detection and control unit 180 include, but are not limited to, the degree of freedom in the whole space and the speed of movement for fast response.

At step 718, the detection and control system 110 is moved to the next desirable location. In some embodiments, the detection and control system 110 is moved by human, manned vehicles, unmanned vehicles, and/or UAVs. In some embodiments, the detection and control system 110 is moved by its own mobility unit. In some embodiments, the detection and control system 110 has an autonomous mobility unit (e.g. an autonomous car, a drone or an UAV) that receives instructions directly from the detection and control system 110 and move the detection and control system 110 to the next desirable location. The advantages of having an autonomous moving vehicle as the mobility unit includes, but not limited to, the speed of movement for fast response and the fully automatic process without requiring human intervention.

At step 724, the detection and control system 110 determines whether to continue the operation. If the operation needs to continue, the detection and control system 110 jumps back to step 704 to continue detecting the contraband devices. If the operation does not need to continue, the detection and control system jumps to step 726. In some embodiments, whether the operation needs to continue is determined by input and/or instructions received by the detection and control system 110. In some embodiments, the input and/or instruction comes from the detection and control system 110 administrator via one of the input method. In one embodiment, the input and/or instruction comes from the facility administrator via the facility control center 160, or from the facility officer via the facility mobility device 170. In some embodiments, the detection and control system 110 have pre-determined instructions to automatically determine whether a continued operation is needed.

It will be apparent to persons skilled in the relevant art(s) that various elements and features of the present disclosure, as described herein, can be implemented in hardware using analog and/or digital circuits, in software, through the execution of computer instructions by one or more general purpose or special-purpose processors, or as a combination of hardware and software.

Figure 8:
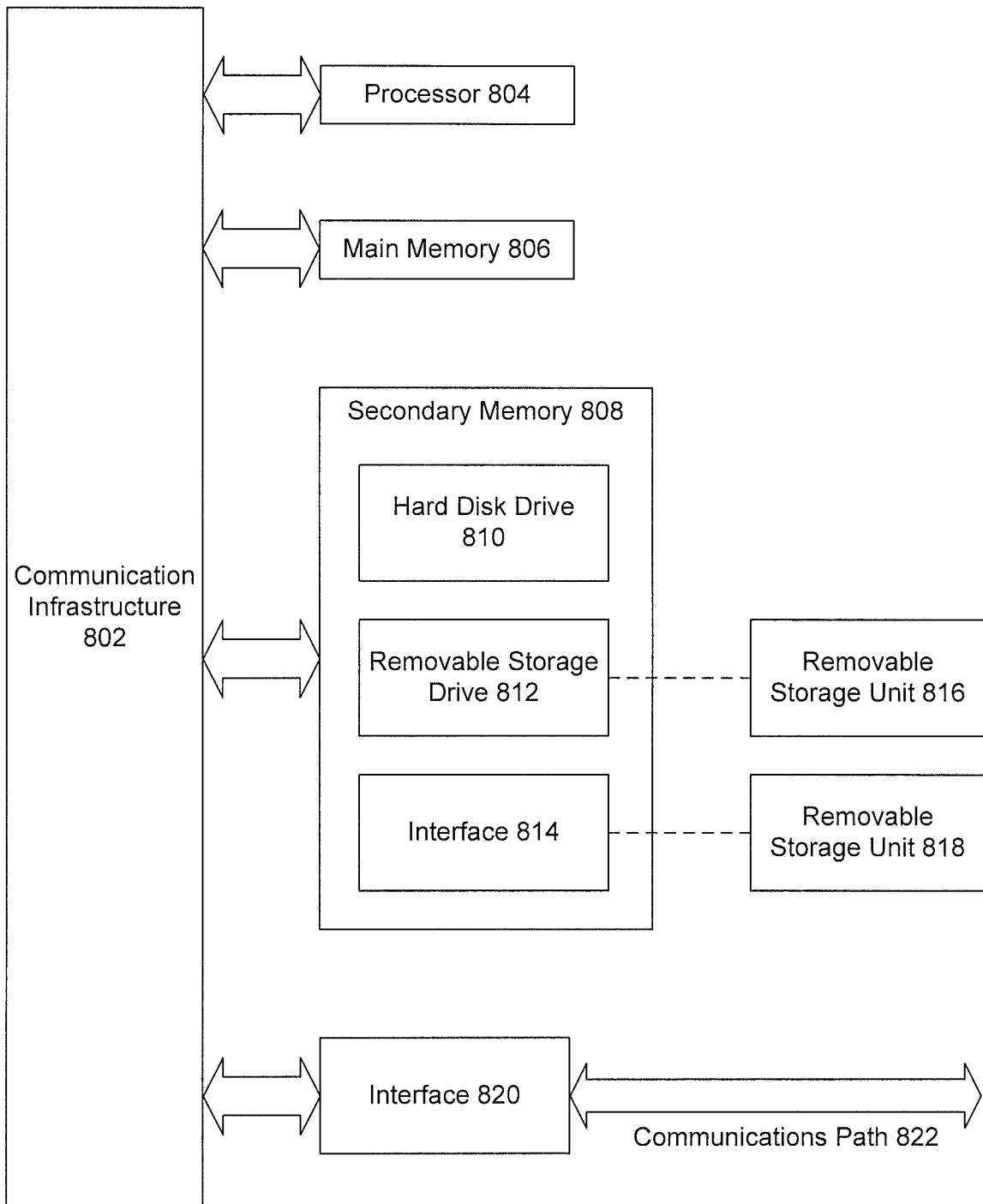
FIG. 8 illustrates a computer system, according to an exemplary embodiment of the present disclosure.

The following description of a general purpose computer system is provided for the sake of completeness. Embodiments of the present disclosure can be implemented in hardware, or as a combination of software and hardware. Consequently, embodiments of the disclosure are implemented in the environment of a computer system or other processing system. For example, the detection and control system 200, the detection and control system 300, the application server 400, and the methods described in FIG. 6 and FIG. 7 can be implemented in the environment of one or more computer systems or other processing systems. An example of such a computer system 800 is shown in FIG. 8. One or more of the modules depicted in the previous figures can be at least partially implemented on one or more distinct computer systems 800.

Computer system 800 includes one or more processors, such as processor 804. Processor 804 can be a special purpose or a general purpose digital signal processor. Processor 804 is connected to a communication infrastructure 802 (for example, a bus or network). Various software implementations are described in terms of this exemplary computer system. After reading this description, it will become apparent to a person skilled in the relevant art(s) how to implement the disclosure using other computer systems and/or computer architectures.

Computer system 800 also includes a main memory 806, preferably random access memory (RAM), and may also include a secondary memory 808. Secondary memory 808 may include, for example, a hard disk drive 810 and/or a removable storage drive 812, representing a floppy disk drive, a magnetic tape drive, an optical disk drive, or the like. Removable storage drive 812 reads from and/or writes to a removable storage unit 816 in a well-known manner. Removable storage unit 816 represents a floppy disk, magnetic tape, optical disk, or the like, which is read by and written to by removable storage drive 812. As will be appreciated by persons skilled in the relevant art(s), removable storage unit 816 includes a computer usable storage medium having stored therein computer software and/or data.

In alternative implementations, secondary memory 808 may include other similar means for allowing computer programs or other instructions to be loaded into computer system 800. Such means may include, for example, a removable storage unit 818 and an interface 814. Examples of such means may include a program cartridge and cartridge interface (such as that found in video game devices), a removable memory chip (such as an EPROM, or PROM) and associated socket, a thumb drive and USB port, and other removable storage units 818 and interfaces 814 which allow software and data to be transferred from removable storage unit 818 to computer system 800.

Computer system 800 may also include a communications interface 820. Communications interface 820 allows software and data to be transferred between computer system 800 and external devices. Examples of communications interface 820 may include a modem, a network interface (such as an Ethernet card), a communications port, a PCM-CIA slot and card, etc. Software and data transferred via communications interface 820 are in the form of signals which may be electronic, electromagnetic, optical, or other signals capable of being received by communications interface 820. These signals are provided to communications interface 820 via a communications path 822. Communications path 822 carries signals and may be implemented using wire or cable, fiber optics, a phone line, a cellular phone link, an RF link and other communications channels.

As used herein, the terms "computer program medium" and "computer readable medium" are used to generally refer to tangible storage media such as removable storage units 816 and 818 or a hard disk installed in hard disk drive 810. These computer program products are means for providing software to computer system 800.

Computer programs (also called computer control logic) are stored in main memory 806 and/or secondary memory 808. Computer programs may also be received via communications interface 820. Such computer programs, when executed, enable the computer system 800 to implement the present disclosure as discussed herein. In particular, the computer programs, when executed, enable processor 804 to implement the processes of the present disclosure, such as any of the methods described herein. Accordingly, such computer programs represent controllers of the computer system 800. Where the disclosure is implemented using software, the software may be stored in a computer program product and loaded into computer system 800 using removable storage drive 812, interface 814, or communications interface 820.

In another embodiment, features of the disclosure are implemented primarily in hardware using, for example, hardware components such as application-specific integrated circuits (ASICs) and gate arrays. Implementation of a hardware state machine so as to perform the functions described herein will also be apparent to persons skilled in the relevant art(s).

It is to be appreciated that the Detailed Description section, and not the Abstract section, is intended to be used to interpret the claims. The Abstract section may set forth one or more, but not all exemplary embodiments, and thus, is not intended to limit the disclosure and the appended claims in any way.

The disclosure has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

It will be apparent to those skilled in the relevant art(s) that various changes in form and detail can be made therein without departing from the spirit and scope of the disclosure. Thus, the disclosure should not be limited by any of the above-described exemplary embodiments, but should be defined only in accordance with the following claims and their equivalents.

What is claimed is:

1. A portable detection device for detecting contraband devices in a controlled-environment facility, the portable detection device comprising:
   a navigation system configured to detect a current location of the portable detection device;
   a radio transceiver configured to conduct a plurality of contraband device scans at various locations, based on the current location detected by the navigation system; and
   one or more processors and/or circuits configured to:
      receive scan results of the plurality of contraband device scans;
      analyze the scan results to determine a plurality of contraband usage parameters; and
      calculate a degree of severity for the controlled-environment facility, based on the plurality of contraband usage parameters, the degree of severity indicating a degree to which contraband devices are being used in the controlled-environment facility.

2. The portable detection device of claim 1, wherein the plurality of contraband usage parameters include a number of contraband devices detected and a distribution of contraband devices in the controlled-environment facility.

3. The portable detection device of claim 2, wherein the one or more processors and/or circuits are further configured to associate a coefficient with each of the plurality of contraband usage parameters.

4. The portable detection device of claim 1, wherein the degree of severity is a numerical number from 0 to 9, where 0 represents no contraband device usage, and where 9 represents severe contraband device usage.

5. The portable detection device of claim 4, wherein the degree of severity is rounded to a nearest integer value.

6. The portable detection device of claim 1, wherein the plurality of contraband device scans include a first contraband device scan of a first scan area at a first location in response to the navigation system detecting the current location as being at the first location, and a second contraband device scan of a second scan area at a second location in response to the navigation system detecting the current location as being the second location, wherein the first contraband device scan detects a presence or an absence of a contraband wireless communication device within the first scan area, and wherein the second contraband device scan detects a presence or an absence of a contraband wireless communication device within the second scan area.

7. The portable detection device of claim 6, further comprising a memory that stores the first location and the second location, stores scan results of the first contraband device scan in association with the first location, and stores scan results of the second contraband device scan in association with the second location.

8. The portable detection device of claim 1, wherein the degree of severity indicates at least one of a number, a density, a distribution, and a frequency of detected contraband devices in the controlled-environment facility.

9. A method for performing a contraband device threat analysis of a controlled-environment facility by a portable detection device, the method comprising:
   detecting a current location;
   conducting a plurality of contraband device scans at various locations, based on the current location;
   receiving scan results of the plurality of contraband device scans;
   analyzing the scan results to determine a plurality of contraband usage parameters; and
   calculating a degree of severity for the controlled-environment facility, based on the plurality of contraband usage parameters, the degree of severity indicating a degree to which contraband devices are being used in the controlled-environment facility.

10. The method of claim 9, wherein the plurality of contraband usage parameters include a number of contraband devices detected and a distribution of contraband devices in the controlled-environment facility.

11. The method of claim 10, further comprising associating a coefficient with each of the plurality of contraband usage parameters.

12. The method of claim 9, wherein the degree of severity is a numerical number from 0 to 9, where 0 represents no contraband device usage, and where 9 represents severe contraband device usage.

13. The method of claim 12, wherein the degree of severity is rounded to a nearest integer value.

14. The method of claim 9, wherein the plurality of contraband device scans include a first contraband device scan of a first scan area at a first location in response to a navigation system detecting the current location as being at the first location, and a second contraband device scan of a second scan area at a second location in response to the navigation system detecting the current location as being the second location, wherein the first contraband device scan detects a presence or an absence of a contraband wireless communication device within the first scan area, and wherein the second contraband device scan detects a presence or an absence of a contraband wireless communication device within the second scan area.

15. A system for determining a contraband threat level of a controlled-environment facility, the system comprising:
   a remote scanner that includes:
      a location subsystem configured to determine a current location of the remote scanner;
      a radio transceiver configured to receive instructions from a terminal, and to carry out a plurality of contraband device scans based on the current location of the remote scanner determined by the location subsystem; and
      a memory configured to store scan results of the plurality of contraband device scans; and the terminal that includes:
a transceiver; and
one or more processors and/or circuits configured to:
cause the transceiver to transmit the instructions to the remote scanner, the instructions including a scan location;
receive, via the transceiver, the scan results from the remote scanner;
analyze the scan results to determine a plurality of contraband usage parameters; and
calculate a degree of severity for the controlled-environment facility, based on the plurality of contraband usage parameters, the degree of severity indicating a degree to which contraband devices are being used in the controlled-environment facility.

16. The system of claim 15, wherein the plurality of contraband usage parameters include a number of contraband devices detected and a distribution of contraband devices in the controlled-environment facility.

17. The system of claim 16, wherein the one or more processors and/or circuits are further configured to associate a coefficient with each of the plurality of contraband usage parameters.

18. The system of claim 15, wherein the degree of severity is a numerical number from 0 to 9, where 0 represents no contraband device usage, and where 9 represents severe contraband device usage.

19. The system of claim 18, wherein the degree of severity is rounded to a nearest integer value.

20. The system of claim 15, wherein the degree of severity indicates at least one of a number, a density, a distribution, and a frequency of detected contraband devices in the controlled-environment facility.

* * * * *